Nov. 27, 1962
K. ZIEGLER ET AL
PROCESS FOR THE REACTION OF ORGANIC
ALUMINIUM COMPOUNDS WITH OLEFINES
Filed Feb. 11, 1959
3,066,162
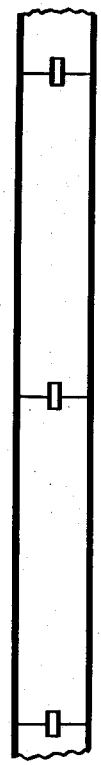
INVENTORS:
KARL ZIEGLER, ROLAND KÖSTER, WOLF-RAINER KROLL
BY
Burgess, Dinklage & Sprung
ATTORNEYS

United States Patent Office 3,066,162
Patented Nov. 27, 1962

3,066,162
PROCESS FOR THE REACTION OF ORGANIC ALUMINIUM COMPOUNDS WITH OLEFINES
Karl Ziegler, Mulheim (Ruhr), and Roland Köster and Wolf-Rainer Kroll, Witten-Annen, Germany; said Köster and said Kroll assignors to said Karl Ziegler
Filed Feb. 11, 1959, Ser. No. 792,598
Claims priority, application Germany Feb. 11, 1958
20 Claims. (Cl. 260—448)

This invention relates to a process for the reaction of organic aluminium compounds with olefines.

It is known that aluminum trialkyls, when in the presence of olefines, exchange their hydrocarbon fractions for the constituents of the olefines in question, whereby olefines corresponding to the hydrocarbon radicals originally present are split off. Such radical exchange frequently takes place spontaneously, but can also be accelerated by certain catalysts, for example nickel. Known examples of such a reaction are as follows:

If aluminium triisobutyl is boiled with 2-ethyl-hex-1-ene, isobutylene is split off and aluminium tri-2-ethyl-hexyl is formed quantitatively:

$$Al(iso-C_4H_9)_3 + 3H_2C=C(C_2H_5)C_4H_9$$
$$\rightarrow Al(-CH_2CH(C_2H_5)C_4H_9)_3 + (CH_3)_2C \rightarrow CH_2$$

This splitting off of olefine proceeds spontaneously at the boiling point of the olefine, which is about 120° C.

If a higher aluminium trialkyl having straight-chain radicals is treated with ethylene in the presence of some colloidal nickel, aluminium triethyl is formed and the alkyl residues of the aluminium are split off in the form of straight-chain α-olefines:

$$Al(C_nH_{2n+1})_3 + 3C_2H_4 \rightarrow Al(C_2H_5)_3 + 3C_nH_{2n}$$

It is quite generally the case that mixtures of aluminium hydrocarbons, and more especially aluminium trialkyls, with olefines form equilibrium systems of the following type:

$$Al(alkyl\ I)_3 + 3\ olefine\ II \rightleftharpoons Al(alkyl\ II)_3 + 3\ olefine\ I$$

it being possible to accelerate the establishment of equilibrium by adding colloidal nickel. Depending on the reaction conditions, there exist possibilities of displacing the equilibria in one or other direction. That is to say, if for example olefine II is used in excess, it is predominantly Al (alkyl II)$_3$ which is found in the final product, whereas the converse is the case when it is olefine I which is in excess. If one of the two olefines participating in the formation of the equilibrium system is more readily voltatile than the other, the removal of this more readily volatile olefine normally renders it possible to obtain finally that aluminium trialkyl the alkyl radicals of which correspond to the less readily volatile olefine. Where reference was made above to the splitting of higher olefines from aluminium trialkyls with ethylene, the reference referred to experiments using ethylene in excess. Conversely, if an excess of ethylene is not used and care is taken to see that the ethylene is free to escape, it is of course also equally possible to produce higher aluminium alkyls and ethylene from aluminium triethyl and higher olefines.

These possibilities of conversion of the aluminium trialkyls can be utilised technically in many various ways by suitable combination with other reactions.

It is moreover known that aluminium hydrocarbons can be converted with ethylene into higher homologues according to the following equation:

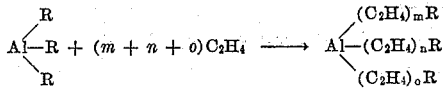

in which the three R's can be the same or different.

The reaction is, for example suitable for converting aluminium triethyl into a stable mixture of higher aluminimum trialkyls, the average molecular weight of these higher aluminium trialkyls depending on the number of mols of ethylene used per atom of aluminium atom. The higher aluminium alkyls produced in this way can be used as intermediate products for the production of other valuable straight-chain compounds; thus, for example, they yield hydrocarbons by hydrolysis and they yield primary fatty alcohols by oxidation and subsequent hydrolysis.

In this synthesis of aluminium hydrocarbons with ethylene, it is in certain circumstances also possible to use organic aluminium compounds in which one valency is bonded to hydrogen. By using such a compound, a mole of ethylene is first of all added to the aluminium-hydrogen bond, so forming an aluminium compound in which all three valencies of the aluminium are bonded to carbon.

One particular feature of the reactions previously described is that they can only be applied to compounds in which all three valencies of the aluminium are bonded to carbon. Aluminium compounds in which only two valencies of the aluminium are bonded to carbon and the third valency to another atom (Y) do not undergo this olefine exchange in the presence of olefines, even in the presence of nickel. For example, monomethoxy aluminium diisobutyl can be boiled for hours with 2-ethyl-hex-1-ene without the formation of isobutylene. In consequence, the various technical possibilities which arise from the olefine-alkyl exchange could not hitherto be realised in respect of aluminium compounds in which only 1 or 2 of the valencies are bonded to carbon. There is equally little possibility of ethylene being added to such substances to form higher homologous compounds of the general formula Y-Al[C$_2$H$_4$)$_n$R]$_2$, in which R represents a hydrocarbon radical.

It has now been found that conversions of organic aluminium compounds with olefines can also be obtained in the case of organic aluminium compounds of the general X$^{(n)}$[Y-AlR$_2$]$_n$, in which X represents any desired monovalent or polyvalent hydrocarbon radical, n the va'ency of the radical X, Y represents oxygen or sulphur and R represents any desired hydrocarbon radical which contains no unsaturated bond on the carbon atom bonded to aluminium, and which is advantageously an aliphatic or aromatic, substituted or unsubstituted, hydrocarbon radical, by working in the presence of aluminium compounds which contain 3 valencies bonded to carbon, or alternatively by using instead dialkyl aluminium hydrides or aluminium hydride.

The radical X-Y in the organic aluminium starting compound can for example be the radical of any desired alcohol, phenol, naphthol or derivatives thereof which is alkyl-substituted in the nucleus. The radicals X and R can be aliphatic, isocyclic, hydroaromatic, mixed aliphatic-isocyclic, mixed hydroaromatic, substituted or unsubstituted aromatic, mixed aliphatic-aromatic, or mixed aromatic-hydroaromatic hydrocarbon radicals.

By the reaction of compounds of the general formula XYAlR$_2$ with ethylene, the process of the invention enables the synthesis of higher organic aluminium compounds. If compounds of the general formula $$X^{(n)}[Y-AlR_2]_n$$

are reacted with ethylene at pressures above 10 atm., advantageously at temperatures between 90 and 170° C. and more especially between 120 and 150° C., substantially higher homologues of the organic aluminium starting compound are obtained. By raising the reaction temperatures to above 170° C., olefines can if desired be split off from the organic aluminium compounds which are formed.

According to another modification of the process, aluminium compounds of the general formula $$X^{(n)}[Y-AlR_2]_n$$

in which at least one radical R is a higher radical than $C_2H_5$, can first be reacted with ethylene at ordinary pressure, and olefines other than ethylene are thereafter obtained, as well as lower or higher homologues of the starting compounds.

It is also possible at will firstly to synthesise a higher organic aluminium compound using ethylene and then, in the presence of nickel, to effect displacement of olefines from the reaction mixture.

For the reaction of higher homologues of the organic aluminium starting compound, it is of course also possible to use higher olefines instead of ethylene. In this case, the olefine corresponding to the radical R is obtained as an end product, as well as a lower or higher homologue of the starting compound $X^{(n)}[Y-AlR_2]_n$.

The catalysts which are suitable according to the invention are inoperative when using aluminium compounds of the general formula $(XY)_2AlR$. This is because a reaction according to, for example, the equation $$(XY)_2AlR + AlR_3 \rightarrow 2XYAlR_2$$

is always possible between an aluminium trialkyl and a compound of the $(XY)_2AlR$ type. The aluminium trialkyl thus remains in the mixture with the compounds of the type $(XY)_2AlR$ and is not obtained as such, and in that case it cannot act as catalyst. It is only when the added quantity of the genuine aluminium trialkyl exceeds the equivalent quantity that the reaction with olefines is possible, but in that case it is not possible to use only small quantities of aluminium trialkyl, and the reaction products, for example, using ethylene, would therefore not have the structure $(XY)_2Al(C_2H_4)_nR$, would instead be of the $XYAl((C_2H_4)_nR)_2$ type.

On the other hand, if a few percent of any desired aluminium alkyl are added in accordance with the invention to, for example, a mixture of methoxy diisobutyl aluminium and 2-ethyl-hex-1-ene for effecting an exchange of hydrocarbon radicals between the aluminium compound of the general formula $XYAlR_2$ and the olefine introduced, the evolution of isobutylene starts immediately and the reaction continues, provided sufficient 2-ethyl-hex-1-ene is present, until all the isobutylene is driven off and the aluminium, apart from the small amount of catalyst, is left as methoxy aluminium di-(2-ethyl-1-hexyl).

By means of the artifice just described, it is also possible for compounds of type $XYAlR_2$ to be converted by reaction with olefines to exactly the same extent and with the same diversity of possibilities into other compounds of the same type but with changed alkyl groups, as was hitherto only possible in respect of those aluminium compounds which contain all three valencies bonded to carbon. This possibility has particular technical significance in combination with the synthesis of higher straight-chain aliphatic compounds from ethylene. According to the known state of the art, such compounds for example higher α-olefines, could be prepared by the following multi-stage process:

*1st stage.*—Synthesis of higher aluminium trialkyls from a lower aluminium trialkyl, for example reacting aluminium triethyl with ethylene:

$$Al(C_2H_5)_3 + 3nC_2H_4 \rightarrow Al((C_2H_4)_nC_2H_5)_3$$

*2nd stage.*—Displacement of the higher olefines from the resulting aluminium trialkyl by reaction with ethylene in the presence of nickel:

$$Al((C_2H_4)_nC_2H_5)_3 + 3C_2H_4 \rightarrow$$
$$Al(C_2H_5)_3 + 3H_2C \rightarrow CH(C_2H_4)_{n-1}C_2H_5$$

It is known that in this case $n$ merely has the significance of an average value and in actual fact a mixture of different olefines and aluminium triethyl are formed in this second stage.

Substantially two forms of this second stage have previously been proposed. The first operates with colloidal nickel as catalyst for the displacement, in which case the reaction takes place very quickly, but the reaction product obtained contains nickel. The second operates with a fixed bed nickel catalyst in the form of lumps and a reaction product free from nickel is obtained, but the reaction velocity is of course very much slower than when using colloidal nickel. If it is desired to establish a technical synthesis of olefines on a repetition of these two reaction stages, the problem arises that the reformed aluminium triethyl must be separated from the olefines in order that it may be returned to the first stage. This is not a simple matter technically; for example, decene and dodecene have boiling points similar to that of aluminium triethyl and consequently the complete separation of these two particularly important olefines from the aluminium triethyl is especially difficult. Moreover, when colloidal nickel is used in the second stage, the presence of this nickel has a considerable nuisance value when attempting to separate the components of the reaction mixture by distillation, because this nickel also catalyses the reformation of higher aluminium alkyls from aluminium triethyl and ethylene which is liberated. For these reasons, the working up of the reaction products when synthesising higher olefines from ethylene in the manner set forth is a difficult technical problem which has not so far been solved in an entirely satisfactory manner.

By means of the process of the invention, these difficulties are overcome at a single blow. According to the invention, aluminium compounds of the general formula $XYAl[(C_2H_4)_nR]_2$ suitable for the foregoing reaction can be synthesised by working in the presence of an aluminium compound having all three valencies of the aluminium bonded to carbon. Such compounds catalyse the "displacement reaction" when working in the presence of nickel. A small quantity of colloidal nickel can consequently be added to the reaction products of the first stage of the process and these can be treated with ethylene, whereby mixtures of a small amount of genuine organic aluminium compounds (the catalysts) with a large quantity of the compound $XYAl(C_2H_5)_2$ and the desired olefines of the general formula $H_2C \rightarrow CH(C_2H_4)_{n-1}C_2H_5$, in which $n$ represents a whole number, are obtained as end products. If the second stage of the reaction is carried out with an olefine other than ethylene, for example propylene or 1-butene, the compound $XYAl(C_3H_7)_2$ or $XYAl(C_4H_9)_2$ is formed in addition to the olefine.

It can very easily be arranged that the separation of such mixtures into their components does not present undue difficulties. First of all, by suitable choice of X, the boiling point of $XYAlR_2$ can be chosen to be higher than the boiling point of the olefine with the highest boiling point (or possibly, when the synthesis is carried out on a large scale it can instead be chosen so that the boiling point is lower than that of the olefine having the lowest boiling point). Furthermore, the catalyst fraction can be made ineffective before distillation is carried out by destroying it by the addition of some aluminium alcoholate or any other suitable substance. For example, use may be made of the following possible reactions:

$$2AlR_3 + Al(OR)_3 \rightarrow 3ROAlR_2$$

or more generally $$Al(XY)_3 + 2AlR_3 \rightarrow 3XYAlR_2$$

or alternatively $$(XY)_2AlR + AlR_3 \rightarrow 2XYAlR_2$$

Other possible ways of inactivating the catalysts rely on the fact that aluminium trialkyls react only in respect of the first Al—C valence with many reagents, whereby they are converted into compounds of the type XYAlR$_2$. For example, aluminium triethyl reacts with carbon dioxide in the following manner:

$$3Al(C_2H_5)_3 + CO_2 \rightarrow (C_2H_5)_3C\text{—}O\text{—}Al(C_2H^5)_2 + (C_2H_5)_2Al\text{—}O\text{—}Al(C_2H_5)_2$$

and with acetone according to the equation:

$$Al(C_2H_5)_3 + (CH_3)_2C=O \rightarrow (CH_3)_2(C_2H_5)COAl(C_2H_5)_2$$

The catalysts can thus be inactivated simply by introducing CO$_2$ or adding a carbonyl compound in a quantity equivalent to the catalyst. Substances with free active hydrogen atoms such as alcohols, thioalcohols or carboxylic acids, are also suitable for this purpose, as are also aluminium salts of carboxylic acids. Thus, 1 mol of aluminium trialkyl is inactivated by 1 mol of alcohol or thioalcohol, 3 mols of aluminium trialkyl are inactivated by 1 mol of carboxylic acid and 2 mols of aluminium trialkyl are inactivated by one equivalent of the salt. With this method of inactivation, it is however necessary to accept the loss of valuable Al—C bonds and/or the formation of substances of the type XYAlR$_2$ other than the starting compounds which were employed.

It is furthermore a convenient manner of producing a starting material suitable for use in the process according to the invention to introduce carbon dioxide into an aluminium trialkyl. When the genuine aluminium trialkyl in the reaction mixture has been rendered inactive in this way, the reaction mixture can be separated into its components by distillation without any danger of subsequent changes.

These great advantages over hitherto known processes are secured in return solely for the loss during the continuous production of olefines from ethylene of the small quantity of true organic aluminium compound required as catalyst. Since, however, only very small quantities of catalyst are necessary, this loss can readily be accepted. In addition, in a technical process in which a certain auxiliary material is used, in this case the aluminium compound of the type XYAlR$_2$, it is also necessary to allow for certain losses of this auxiliary compound. It can easily be appreciated that the addition of the catalyst and its inactivation prior to distillation can be so arranged, by suitable choice of the catalyst itself and of the inactivating substance, that together they just serve to effect the necessary replenishment of the auxiliary compound.

In order to explain this by reference to an example, assume that phenoxy aluminium diethyl is used as auxiliary compound and aluminium triethyl as catalyst; in this case the inactivation of the catalyst is preferably carried out either with aluminium phenolate or with di-(phenoxy)-aluminium ethyl, so that additional quantities of the auxiliary compound phenoxy aluminium diethyl are formed during the catalyst inactivation, whereby losses of that compound are made good.

All olefines up to hexadecene can be distilled off cleanly from phenoxy diethyl aluminium, and this is possible with olefines of even higher molecular weight when naphthyloxy aluminium diethyl is used. In addition compounds of the type XYAl(C$_2$H$_5$)$_2$ are frequently readily crystallisable. This is, for example, true of the two aryloxy aluminium diethyl compounds which have just been referred to. Thus, separation of the olefines can be effected by filtration or centrifuging. Such a high boiling point for the organic aluminum compound can also be obtained by introducing the dialkyl aluminium into dihydric or polyhydric alcohols, mercaptans or phenols, whereby compounds such as:

$$R_2Al\text{—}O\text{—}(CH_2)nO\text{—}AlR_2$$
$$(n>1)$$

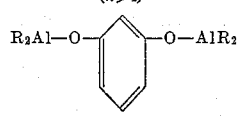

$$CH_3\text{—}C(CH_2\text{—}O\text{—}AlR_2)_3$$
$$C[CH_2\text{—}O\text{—}AlR_2]_4$$

and similar compounds may be obtained.

The aforementioned combination of reactions with that of the process of this invention is probably one of the most imporant applications of the process of this invention.

The catalytic action of the catalysts which may be used according to the invention, especially the aluminium trialkyls, is particularly good in the synthesis reaction with ethylene if the compounds of the general formula XYAlR$_2$ are heated with ethylene, preferably under pressure, to temperatures between 90 and 250° C., especially between 90 and 170° C. and more particularly between 120 and 150° C. Very small quantities of catalyst are sufficient, but the velocity of the reaction is naturally related to the amount of catalyst. Adequate velocities can be produced with 1–5% of the catalytic aluminium compounds, but the use of either smaller or larger quantities of catalyst is not excluded. Furthermore, the necessary quantity of catalysts is also dependent on the purity of the ethylene employed. Certain impurities of ethylene, such as CO$_2$ or acetylene, react with the aluminium trialkyls used as catalysts and render them ineffective. Consequently, it can happen that the reaction according to the invention ceases after a certain time. In such cases, the reaction can be restarted by adding more of the catalytic aluminium compound. It will readily be apparent from these remarks that the requisite quantity of catalyst should be related to the degree of purity of the ethylene used.

The quantity of ethylene which may be reacted according to the process of the invention is practically unlimited. Using only a few mols of ethylene per mol of aluminium compound, it is possible to obtain reaction products which still contain alkyl radicals of fairly low molecular weight, for example butyl hexyl or octyl radicals, when starting with ethyl aluminum compounds, while substances with dodecyl, tetradecyl, hexadecyl, octadecyl and like radicals on the aluminium may be obtained by using greater proportions of ethylene. If the quantity of ethylene is still further increased, substances with very long-chain molecules on the aluminum, i.e. with perhaps 30 to 60 carbon atoms or even more, are ultimately obtained. Olefines are also obtained as secondary products, but the quantity thereof can be restricted if the reaction temperatures are not raised substantially above 150° C.

This modification of the process according to the invention has a number of advantages as compared with what has hitherto been known. The aluminium compounds obtained, like the original aluminium trialkyls, are valuable intermediate products for the production of a number of other compounds. By oxidation, the products of the process according to the invention can be converted into aluminium alcoholates and also into alcohols in exactly the same way as, for example, the aluminum trialkyls prepared by the process of German patent specification No. 961,537.

One particular advantage of the synthesis reaction according to the invention resides in the fact that the starting materials, for example dialkyl aluminium compounds, can be manipulated much more readily than the corresponding aluminium trialkyls, provided X is suitably chosen. For example, aluminium triethyl is spontaneously inflammable, but the compound C$_4$H$_9$OAl(C$_2$H$_5$)$_2$ is not.

It was mentioned above that the products of the process of the invention can also be used as intermediates for the production of alcohols. If such a use is envisaged, it is advisable for compounds of the type $ROAl(C_2H_5)_2$ to be employed in the reaction and for these compounds to be built up with ethylene by the process of the invention until the alkyl chains are of the required length. The radical OR is so chosen that it corresponds to that alcohol to be produced in the reaction. This may be achieved in a very simple manner by reacting an oxidation final product, i.e. an aluminium alcoholate of the general formula $Al(OC_nH_{2n+1})_3$, in known manner with 2 molecules of aluminium triethyl. In this way, 3 molecules of $C_nH_{2n+1}OAl(C_2H_5)_2$, are formed, which can be built up to 3 molecules of $C_nH_{2n+1}OAl(C_nH_{2n+1})_2$ by adding some aluminium trialkyl as catalyst; on oxidation, these latter 3 molecules are finally again converted into 3 molecules of $Al(OC_nH_{2n+1})_3$. Of these molecules, two-thirds can be hydrolysed to aluminum hydroxide and the desired alcohols and one-third can be returned to the above-mentioned reaction sequence.

An additional advantage of the synthesis reaction according to the invention is to be seen in the fact that with the known synthesis reaction of aluminium triethyl, the reaction only proceeds at a very moderate speed. The yield per unit of volume and time is not very high with the usual experimental temperatures of 100–120° C. If attempt is made to raise the temperature this may, on the one hand, lead to an explosive degeneration, in the course of which the ethylene forced in is largely decomposed into carbon and hydrogen. At higher temperatures, the splitting off of the olefine assumes larger proportions and the reaction products then contain considerable quantities of α-olefines.

However, even at relatively high temperatures, these α-olefines are present together with aluminium alkyls and are dimerised in known manner, so that the normal synthesis reaction of aluminium triethyl with ethylene, if it is desired to carry it out at temperatures substantially higher than 120° C., no longer leads to uniform straight-chain materials; the branched dimeric olefines additionally formed have a considerable disturbing effect.

On the other hand, if an aluminium compound of the type $XYAlR_2$ is used and if a small quantity of aluminium trialkyl is added thereto as catalyst, the reaction velocity in the reaction with ethylene is of course initially reduced still further, since the addition of aluminium trialkyl in only a small quantity determines the speed. This reaction can now expediently be compensated or over-compensated for by suitable raising of the temperature, because the major part of the aluminium compounds formed in the reactor is continuously present in that form of the type $XYAlR_2$ which is inert wtih respect to olefines. Even when olefine is split off, this only meets the small quantities of the genuine aluminium trialkyls used as catalysts and therefore the dimerisation cannot assume any great proportions.

The following examples further illustrate the invention:

EXAMPLE 1

298 g. of monoethoxy-di-n-octyl-aluminium are introduced into an autoclave which is flushed with nitrogen and into which 1 litre of air-free liquid dry propylene is then forced under pressure. There is no change in the mixture over a period of several days and months, and this can easily be proved by taking occasional samples. A catalyst mixture is then prepared by carefully introducing 1 g. of nickel acetyl acetonate suspended in 20 cc. of hexane into 20 g. of aluminium tripropyl and the deep blackish-brown mixture is then forced by suitable means into the autoclave. If the autoclave is left to stand at room temperature, or if it is heated slightly to 30–40° C., it will soon be established from samples taken that changes are occurring in the mixture. The samples are drawn carefully from the liquid phase by way of a valve and through a capillary tube directly into a vessel which is filled wtih nitrogen and cooled to −80° C. After quickly driving off the propylene at the lowest possible temperature, decomposition is carried out by adding methanol. Propane escapes, this being a sign that propyl groups bonded to aluminium have been formed, and a $C_8$-hydrocarbon which contains octane and 1-octene is obtained. In the course of a series of such samples, the quantities of 1-propane and 1-octene become increasingly larger, and the octane finally almost completely disappears. Eventually, the equilibrium $C_2H_5OAl(C_8H_{17})_2 + 2C_3H_6 \rightleftharpoons C_2H_5OAl(C_3H_7)_2 + 2C_8H_{16}$ has been adjusted, this being far to the right on account of the large excess of propylene employed. This condition is reached after a few hours.

If the contents of the autoclave are now emptied out and if the propylene is extracted by boiling under nitrogen, the process again becomes retrogressive and, with the disappearance of the last part of the propylene, there is again present only the ethoxy dioctyl aluminium, plus some aluminium tripropyl.

If it is desired to recover ethoxydipropyl aluminium as well as 1-octene, 16 g. of dry alcohol-free aluminium ethylate are introduced into the mixture immediately after removal and is thoroughly mixed. There is no longer any displacement back of the equilibrium and the propylene can then readily be distilled off. Distillation of the residue in vacuo from a bath at a temperature of 100° C. yields about 100 g. (90% of the theoretical) of 1-n-octene as distillate. The residue is ethoxy dipropyl aluminium and boils at 95° C./0.5 mm. Hg. It is a colourless liquid.

The starting material for this experiment can easily be prepared from 244 g. of aluminium trioctyl by heating briefly with 54 g. of aluminium ethylate to 100° C. until the ethylate is completely and homogeneously dissolved.

EXAMPLE 2

172 g. of methoxyaluminium diisobutyl (prepared by careful addition of 32 g. of anhydrous methanol to 142 g. of aluminium diisobutyl hydride under nitrogen) are mixed under nitrogen with 500 g. of 2-ethyl-hex-1-ene and thereafter boiled under reflux at 120° C. Even after boiling for a number of hours no gas has escaped. Finally, aluminium triisooctyl is added by way of the reflux condenser in small quantities, each of about 2 cc.'s. There is usually still no sign of change after the first additions, since the methoxy aluminium diisobutyl may contain, due to autoxidation, a little of a dialkoxy product, by which the aluminium triisooctyl is destroyed. From a point when a certain quantity has been added, evolution of isobutylene commences, and the speed of this can be increased by a few further additions and can be brought to a level which is convenient to control. Quantities between 10 and 30 g. have proved to be desirable. Under the circumstances, 5–7 hours are sufficient for driving off the correct quantity of isobutylene. The isobutylene is condensed in a trap cooled to −80° C. A total of 100–110 g. is obtained.

The 2-ethyl-hexene used in excess is thereafter distilled under vacuum with a bath temperature at a maximum of 100° C. and then the methoxy diisooctyl aluminium is distilled under highest possible vacuum. It is a colourless oil, boiling point 180° C. at $10^{-2}$–$10^{-3}$ mm. Found: Al 9.5%; calculated for $CH_3OAl(C_8H_{17})_2Al$: 9.7.

EXAMPLE 3

60 g. of cyclohexyl-aluminium-di-n-hexyl:

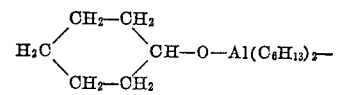

(prepared by reacting aluminium tri-n-hexyl and aluminium-cyclohexylate in the molar ratio of 2:1) are heated to 150° C. in a cylindrical glass vessel with an internal diameter of about 3 cm., whereupon dry and air-free propylene is circulated therethrough at a speed of 40 normal litres per hour by means of a glass frit. The propylene absorbed is constantly made good. The discharging stream of propylene passes through two cooling traps cooled to 0° and —23° C. Initially, no reaction (and no absorption of propylene) can be detected. The splitting off of hexene starts after 2 g. of aluminium tri-hexyl have been added. The hexene is advantageously collected in the second cooling trap. Some aluminium tripropyl is condensed in the first trap, and this is returned at intervals into the reaction vessel. Finally, 30 g. of 1-hexene are obtained in the second receiver and 42 g. of cyclohexyloxy dipropyl aluminium is contained in the reaction vessel. This is a colourless viscous oil. Calculated Al 12.9; found 12.6. The reaction lasts about 10 hours. If the temperature is raised to 200° C., the hexene is completely split off after only 1 hour. The 1-hexene in this event, however, contains about 10% of 2-hexene.

If ethylene is used instead of propylene, the quantity of hexene is reduced to 25 g. and 5–6 g. of n-octene are also formed. 33 g. of cyclohexyloxy-dimethyl aluminium remain in the reaction vessel.

EXAMPLE 4

214 g. of butyloxy dibutyl aluminium are mixed with 20 g. of aluminium tributyl and heated to 170° C. At this temperature, 1-octene vapour is introduced, this having been brought to boiling point in a separate vessel. The vapour which passes through is condensed, by way of a reflux condenser kept at about 40° C., into a receiver. Immediately after the commencement of the experiment, 1-butene escapes from the receiver and is collected in a second receiver cooled to —80° C. 2000 g. of octene are distilled by the apparatus in the course of about 2 hours. Residues of dissolved butene are driven out of the condensed 1-octene by boiling for a brief period under reflux and the octene is returned to the vapour generator. After being repeated 2–3 times, no more butene is developed and the butyloxy dibutyl aluminium has been converted into 326 g. of butyloxy di-n-octyl aluminium, mixed with 36 g. of aluminium trioctyl. In order to produce a completely homogeneous product, 12.3 g. of aluminium butylate can be added and the aluminium trioctyl thereby also converted into butyloxy di-n-octyl aluminium.

EXAMPLE 5

114 g. of aluminium triethyl are mixed very carefully under nitrogen and while cooling wtih a mixture of 60 g. of completely anhydrous n-propyl alcohol and 300 cc. of n-hexane, ethane being developed in a violent reaction in which monopropoxy diethyl aluminium is also formed. The hexane is thereafter distilled off and about 4/5 of the liquid residue are introduced into a 1000 cc. autoclave which has been flushed in advance with nitrogen, and then 112 g. of dry and oxygen free ethylene are forced in under pressure. If the autoclave is now heated while shaking to 140–150° C., a pressure of about 200 atm. is adjusted, this pressure remaining constant for several hours. No absorption of ethylene takes place. The autoclave is cooled and then a mixture of the retained residual fifth of propoxy diethyl aluminium is forced in with 8 g. of diethyl aluminium hydride, using a small liquid injection pump. If the autoclave is now heated again while shaking, a distinct fall in pressure is observed from about 120° C. At 130° C., the absorption of ethylene becomes brisk and after 6–7 hours the pressure has fallen from a maximum of about 200 atm. to 20 atm.

The autoclave is cooled, the residual pressure is blown off and the liquid contents of the autoclave are emptied out under nitrogen. A few grams of liquid olefins in substantially a mixture of n-1-hexene and n-1-octene can be extracted therefrom by heating in vacuo to 100–200° C. The remaining liquid reaction product has an aluminium content of about 11% and consists of a mixture of higher propoxy aluminium dialkyls of the average composition $C_3H_7OAl[(C_2H_4)_2C_2H_5]_2$.

This can easily be shown by hydrolysis. A reaction product is obtained which is insoluble in water and which, after the n-propanol has been completely washed out with water, still consists only of paraffins with, perhaps, a small percentage of straight-chain olefins. By carrying out fine distillation with a rotating band column, there are obtained: hexane 43 g., octane 36.5 g., decane 23 g., dodecane 11 g., tetradecane 4 g.

The Examples 6–12 set out in the following table were carried out according to the pattern of this Example 5, with the single difference that the catalyst was added at the start. The working up by hydrolysis at the end with formation of paraffins and the compounds of the general formula XYH was done only to prove the course of the reaction. The working up is however somewhat different, depending on the nature of XYH. If the XYH is appreciably acid (for example when XYH is a phenol, thiophenol or mercaptan), it is washed with alkali. If XYH is a low alcohol, it is extracted with water. If XYH is an alcohol which is only moderately soluble in water, it is treated with aqueous methanol. When XYH is highboiling, the paraffins are simply distilled off. Special working up methods which are necessary in individual cases are indicated briefly in the last column of the table.

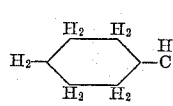

| Ex. No. | Aluminium compound of the type $XYAlR_2$, formula and quantity | Catalyst | Quantity of ethylene, g. | Temperature, °C. | Period of experiment, hours | Hydrocarbons obtained by hydrolysis, quantity and composition | Working up method after hydrolysis |
|---|---|---|---|---|---|---|---|
| 6 | $CH_3S.Al(C_8H_{17})_2$ (n), 380 g | $Al(C_4H_9)_3$ (n), 59 g | 168 | 140 | 10 | $C_8$, 10 g.; $C_{10}$, 38 g.; $C_{12}$, 70 g.; $C_{14}$, 79 g.; $C_{16}$, 69 g.; $C_{18}$ and higher 87 g. | Washed with alkali. |
| 7 | $(CH_3)_3C-O-Al(C_5H_{11})_2$ (n), 242 g | $AlH_3$, 2 g | 112 | 150 | 2 | $C_5$, 16 g.; $C_7$, 49 g.; $C_9$, 64 g.; $C_{11}$, 50 g.; $C_{13}$, 30 g.; $C_{15}$, 13 g.; $C_{17}$, 5 g.; also a few percent of straight chain. | Washed with water. |
| 8 | $C_6H_5-CH_2-O-Al(C_{18}H_{37})_2$ (n) | $Al(CH_2-CH.C_3H_7)_3$, 20 g. | 224 | 130 | 20 | $C_{10}$, 9 g.; $C_{20}$, 59 g.; $C_{22}$, 78 g.; $C_{24}$ to $C_{30}$, 500 g. (not separated). | Vacuum distillation, benzyl alcohol forms first runnings. |
| 9 | $H_2$—⟨cyclohexyl⟩—$CH_2-CH_2-O-Al(C_3H_7)_2$, 240 g | $Al(C_3H_7)_3$, 10 g | 56 | 160 | 1 | $C_3$, 29.4 g.; $C_5$, 49 g.; $C_7$, 32 g.; $C_9$, 14 g.; $C_{11}$, 4.5 g. | Distillation, hexahydrophenol ethyl alcohol remains in residue. |

Table

| Ex. No. | Aluminium compound of the type XYAlR₂, formula and quantity | Catalyst | Quantity of ethylene, g. | Temperature, °C. | Period of experiment, hours | Hydrocarbons obtained by hydrolysis, quantity and composition | Working up method after hydrolysis |
|---|---|---|---|---|---|---|---|
| 10 | $C_6H_5$—S—$Al(C_4H_9)_2$ (iso), 250 g | $Al(C_4H_9)_3$ (iso), 18 g | [a] 280 | 125 | 30 | $C_2$, 3.6 g.; $C_4$,[b] 135 g.; $C_6$, 37 g.; $C_8$, 46.8 g.; $C_{10}$, 44.2 g.; $C_{12}$, 23.8 g.; $C_{14}$, 11.9 g.; $C_{16}$, 7.3 g.; $C_{18}$, 2 g. | Washed with alkali. |
| 11 | —O—$Al(C_{12}H_{25})_2$, 486 g | $AlH(C_4H_9)_2$, 1 g | 560 | 170 | 3 | $C_{12}$, 3 g.; $C_{14}$, 7 g.; $C_{16}$, 16 g.; $C_{18}$, 20 g.; $C_{20}$ to $C_{30}$ 400 g., and 295 g. residue ($C_{32}$ to about $C_{34}$). | Do. |
| 12 | $C_{12}H_{25}$—S—$Al(C_2H_5)_2$, 286 g | $Al(C_2H_5)_3$, 30 g | 140 | 90 | 40 | $C_2$, 4.8 g.; $C_4$, 22.1 g.; $C_6$, 38.8 g.; $C_8$, 42.2 g.; $C_{10}$, 31.2 g.; $C_{12}$, 22 g.; $C_{14}$, 10.5 g.; $C_{16}$, 5.2 g.; $C_{18}$, 2 g. | Distillation, then washed with alkali. |

[a] Only 210 g. used.  [b] This fraction contains 120 g. isobutylene.

EXAMPLE 13

*(Higher α-Olefines From Ethylene)*

(a) A pressure-tight steel tube 20 metres long and of an internal diameter of 3 cm., enclosed by a liquid heating or cooling system (or a corresponding number of shorter steel tubes arranged in series and connected by way of copper capillary tubes) is provided in 20 cm. long sections with fittings as indicated in the single FIGURE of the accompanying drawings, so that it is subdivided into altogether 100 small separate sections. The tube is heated to 100° C. and filled with ethylene at a pressure of 100 atm. The pressure of the ethylene is at the outlet reduced to about 10 atm. in a receiver and is supplied from the latter to a compressor, which delivers it again in circulation at a pressure of 100 atm. to the input end of the pressure tube. Molten phenoxy diethyl aluminium containing 1% of aluminium triethyl is forced into the input end of the reactor through a second inlet by means of a heated liquid injection pump. The first stage of the compressor can in addition be supplied with ethylene, which is preferably washed, at a pressure of about 10 atm. and, while cold, with aluminium triethyl or molten phenoxy diethyl aluminium. The ethylene introduced should as far as possible contain no oxygen, no moisture, no $CO_2$, no acetylene and no sulphur compounds.

Fresh ethylene is initially still not allowed to enter the apparatus. The pressure changes in proportion as the reactor fills with liquid. This pressure is kept constant at about 100 atm. When the reactor is substantially filled, the temperature is raised until a drop in pressure is observed, indicating the absorption of ethylene. The temperature is so regulated that the fall in pressure is about 4 atm./min. If a temperature substantially higher than 150° C. is necessary for this purpose, somewhat more aluminium triethyl must be added to the phenoxy diethyl aluminium. At this rate of ethylene absorption, undesirable accumulations of heat can reliably be avoided. When this point is reached, the ethylene pressure is maintained constant at about 100 atm. by supplying fresh ethylene into the system and the injection pump for the liquid aluminium compound is set for such a speed that the aluminium compound to be extracted at the bottom of the receiver at the end of the apparatus has an aluminium content which corresponds to the desired average molecular weight. If the apparatus is operated by starting at a relatively high injection speed which is later moderated, the liquid reaction product to begin with still contains a considerable quantity of starting material, and this must then be fed in through the injection pump again. Finally, however, the arrangement operates in a completely uniform manner. For example, with an injection speed of 3 kg./hour and at 152° C., the speed of absorption of the ethylene was 3 kg./hour and the liquid reaction product had a constant aluminium content of 7.5%. In this way, 1000 kg. of the final reaction product were eventually obtained from 500 kg. of phenoxy diethyl aluminium.

(b) By carefully introducing 100 g. of finely powdered nickel acetyl acetonate in 400 cc. of hexane and 500 cc. of aluminium triethyl in a nitrogen atmosphere, a solution or suspension of colloidal or finely divided nickel in aluminium triethyl is produced and it is mixed with the reaction product obtained according to (a). The liquid is pumped to a trickle tower provided with filler bodies, this tower being filled with ethylene at a pressure of 20 to 100 atm. The temperature is kept at 20–40° C. It is also possible here to use the artifice mentioned in German patent specification No. 1,001,981, and also to add an acetylene hydrocarbon. This however, is not usually necessary. The reaction can be followed (1) from the ethylene absorption in the tower (the pressure being kept constant and the ethylene supplied measured), (2) from the quantity of the ethane developed in the hydrolysis of samples of the downwardly discharging liquid. The reaction is completed when 2 mols of ethane have been formed per atom of aluminium. If necessary, the product is passed repeatedly through the tower.

(c) The fully converted product now has added to it 3.1 kg. of dry aluminium phenolate and is distilled, preferably immediately in vacuo. There are obtained 472 kg. of an olefine mixture up to the boiling point 110° C. ($10^{-3}$ mm. Hg). Remaining in the residue are 498 kg. of phenoxy diethyl aluminium. The nickel flocculates during the distillation and can be recovered by filtration. The organic aluminium product boils at 120° C. ($10^{-3}$ mm. Hg). It can be returned to the process after a fresh addition of aluminium triethyl.

The olefine mixture obtained is distilled in a column filled with wire spirals (height 4 m., diameter 8 cm.). In addition to 34 kg. of butene, the following liquid olefines are obtained:

| | |
|---|---|
| 80 kg. of 1-hexene | B.P. 63° C./760 mm. Hg. |
| 101 kg. of 1-octene | B.P. 122° C./760 mm. Hg. |
| 98 kg. of 1-decene | B.P. 60° C./12 mm. Hg. |
| 69 kg. of 1-dodecene | B.P. 88° C./12 mm. Hg. |
| 35.5 kg. of 1-tetradecene | B.P. 122° C./12 mm. Hg. |
| 20.5 kg. of 1-hexadecene | B.P. 150° C./12 mm. Hg. |

EXAMPLE 14

The procedure in the first stage is as described in Example 13, but in the second stage, after adding the nickel catalyst, the substance is dissolved in 3000 kg. of liquid propylene and is further processed according to Example 1. The fresh equilibrium is reached after approximately 5 hours. 3.1 kg. of dry aluminium phenolate are introduced into the reactor and the mixture is thoroughly stirred for approximately 1 hour. The propylene is then distilled off and the further procedure is then in accordance with Example 13. In addition to 465 kg. of olefines with a boiling range of 63° C./760 mm. Hg to 150° C./12 mm. Hg, phenoxy dipropyl aluminium is obtained as a high-boiling residue.

This modification of Example 13 is important when it is desired to change over from the synthesis of even-numbered olefines to odd-numbered olefines. The converse is also readily possible by introducing the phenoxy dipropyl aluminium into stage (1) and ethylene again into stage (2).

EXAMPLE 15

The procedure is as described in the preceding example, but the starting compound used is monomethoxy diethyl aluminium, activated by aluminium triethyl, and the reaction in the reactor is adjusted to a final aluminium content of 4%. The first reaction product is in part solid, and it must therefore be worked in the second stage at a somewhat higher temperature, for example 60–70° C. In the distillation in the third stage, the aluminium compound $CH_3OAl(C_2H_5)_2$ distills over together with the smaller fraction of the olefines as first runnings at 110° C./10 mm. Hg. It can be used again in this form. The olefines can however also be converted, by boiling with their equivalent quantity of aluminium triisobutyl or aluminium diisobutyl hydride in toluene, into the corresponding aluminium trialkyls, from which the methoxy diethyl aluminium can easily be separated by a second distillation.

The major part of the olefinic reaction products remains in the residue in the first distillation. It is preferably obtained in pure form by distillation under high vacuum. From 1000 kg. of reaction product of stage (1) 480 kg. of these olefines, which comprise the molecular range from about $C_{14}$ to $C_{30}$, are obtained.

EXAMPLE 16

A pressure-tight steel tube 6 m. long and with an internal diameter of 1 cm. is twisted into a vertically disposed coil with a diameter of 20 cm. and a height of 1 m. and enclosed in a separate vessel which is filled with a liquid of suitable boiling point (for example "Diphenyl"). It is heated to 200° C. Ethylene can be supplied laterally through a capillary tube at the upper end of the lower third of the coiled tube. Ethoxy diethyl aluminium containing from 1% to, at the most, 2% of aluminium triethyl is pumped into the tube and at the same time a stream of ethylene at a pressure of 10 atm. is allowed to enter through the lateral capillary tube. The aluminium compound is heated to 200° C. in the lower third of the system. It then enters into reaction with the ethylene and is at the same time forced rapidly by the stream of ethylene through the upper two-thirds of the coil. The discharging ethylene and reaction product are quickly cooled and fed to a receiver, from which the ethylene can be extracted at the top and the liquid reaction product at the bottom. The ethylene is returned to the cycle, but before this happens, it is freed in known manner from entrained butylene and hexene fractions by suitable cooling, washing or by absorption on carbon. The pump is so adjusted that the contact time between ethylene and liquid is between 1 and 10 minutes and the stream of ethylene is about 10–20 times the liquid stream, calculated on the volume of the compressed ethylene.

The liquid reaction product consists of a mixture of olefines (predominantly with the grouping →$CH_2$ at the end, as can easily be seen from the infra-red spectrum) with higher homologues of the ethoxy diethyl aluminium introduced (which can most easily be proved by hydrolysis of the complete mixture and examination of the hydrocarbons which are formed). In addition to ethyl alcohol, hexene+hexane, octene+octane, decene+decane and higher hydrocarbons are obtained. The paraffins correspond to the alkyl groups originally bonded to aluminium. The ethylene must be very pure for this experiment.

EXAMPLE 17

A mixture of higher aluminium trialkyls of the required average molecular weight is first of all formed, in accordance with German patent specification No. 878,560, from an aluminium trialkyl and ethylene, and this mixture is oxidised in accordance with the process of co-pending application Serial No. 524,798, filed July 27, 1955 and issued as U.S. Patent No. 2,892,858 on June 30, 1959 to form the corresponding higher aluminium alcoholate. In a specific case, for example, 50 kg. of such an alcoholate were prepared, this alcoholate having been obtained from 28 kg. of aluminium tri-n-hexyl and 17 kg. of ethylene after thorough treatment, first with air and then with oxygen. This alcoholate is mixed with 60 kg. of aluminium tri-n-hexyl. The exactly equivalent quantity in accordance with $2R_3Al + Al(OR)_3 \rightarrow 3R_2AlOR$ should be 56 kg. The aluminium trihexyl is therefore present in slight excess. 34 kg. of ethylene are added to 110 kg. of the mixture in the apparatus, in accordance with Example 13, and the production product is then again thoroughly oxidised by the process disclosed in U.S. Patent No. 2,892,858. 50 kg. of the alcoholate obtained are separated for return to the same process. The remainder, which is somewhat more than 100 kg., is decomposed with water and sulphuric acid is added thereto until the aluminium hydroxide has completely dissolved. The oily layer of the alcohols separating out is removed, washed with water and some alkali and finally distilled on a very efficient column.

7.0 kg. of n-hexyl alcohol, 19 kg. of n-octyl alcohol, 24 kg. of n-decyl alcohol, 18 kg. of n-dodecyl alcohol and 10 kg. of tetradecyl alcohol are obtained, leaving 8 kg. of residue in which even higher alcohols are present.

EXAMPLE 18

30 G. of aluminium tribenzyl are mixed under nitrogen with 11.5 g. (the theoretical quantity would be 12.3 g.) of aluminium tri-sec-butylate $Al(O-CH(CH_3)C_2H_5)_3$ which had been carefully distilled in vacuo in advance, and the mixture reacted in a 200 cc. autoclave with 17 g. of ethylene under the conditions used in Example 5. A liquid reaction mixture containing 4.7% of aluminium is obtained. It can easily be established by hydrolysis that this mixture must substantially contain a homologous aluminium compound of the average composition:

$$(sec.\ C_4H_9)-O-Al[(C_2H_4)_2CH_2-C_6H_5]_2$$

This yields 45 g. of an oily reaction product which may be separated by distillation into the following fractions:

| Sec-butanol | Toluene | 1-phenyl-propane | 1-phenyl pentane | 1-phenyl heptane |
|---|---|---|---|---|
| B.p., 99° C. | B.p., 111° C. | B.p., 55° C./ 20 mm. Hg. | B.p., 85° C./ 20 mm. Hg. | B.p., 120° C./ 20 mm. Hg. |
| 4 g. | 8.3 g. | 7 g. | 3 g. | 2 g. |

EXAMPLE 19

354 G. of the aluminium trialkyl derived from 1-vinyl-3-cyclohexene and having the formula:

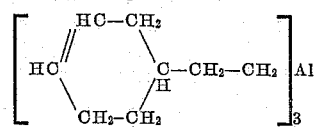

and prepared according to German patent specification No. 917,006 are mixed under nitrogen with 500 cc. of dry and air-free toluene. 31 g. of ethylene glycol which had been completely dehydrated and freshly distilled in vacuo are added dropwise to the mixture while stirring vigorously. The glycol dissolves with evolution of heat. When the mixture has become homogeneous, toluene is first of all distilled off together with 110 g. of 1-ethyl-3-cyclohexene, finally in vacuo.

5 g. of aluminium triethyl are added to the thick oily residue and the mixture is transferred under nitrogen into a 1-litre autoclave. 112 g. of ethylene are forced in and the further procedure is as indicated in Example 5. The liquid autoclave content which is finally obtained is treated as described in Example 1 with 1 litre of liquid propylene in the presence of colloidal nickel and aluminium tripropyl. Finally 0.75 mol of anyhydrous glycol per molecule of the true aluminium trialkyl present in the mixture is introduced and the propylene is then extracted by boiling. The residue can be cleanly separated by vacuum distillation into 280 g. of a hydrocarbon mixture with the boiling range 70° C./20 mm. Hg to 160° C./0.5 mm. Hg and an undistillable residue of the compound

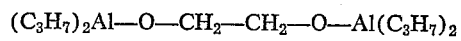

$(C_3H_7)_2Al-O-CH_2-CH_2-O-Al(C_3H_7)_2$

It can be concluded from the infrared spectrum of the distillate that terminal vinyl groups and cyclohexenyl radicals are present in equal numbers. The distillate therefore certainly consists of a mixture of some homologous diolefines of the general formula

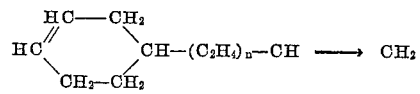

wherein $n$ represents 1, 2, 3 and higher numbers.

What we claim is:

1. In the growth reaction process in which an organo aluminum compound is reacted with an alpha olefin under conditions causing the olefin to add to an organic radical connected to the aluminum increasing the molecular size thereof, the improvement which comprises effecting the reaction using an organo aluminum compound having two hydrocarbon radicals directly connected to the aluminum atom with a carbon atom free of unsaturated bonds and a third hydrocarbon radical connected to the aluminum atom through a member selected from the group consisting of oxygen and sulfur atoms, and additionally effecting the reaction in the presence of a catalyst comprising an aluminum trialkyl.

2. Improvement according to claim 1 in which said olefin is ethylene and in which the two hydrocarbon radicals directly connected to the aluminum atom in said organo aluminum compound are ethyl radicals.

3. Improvement according to claim 1 in which said olefin is ethylene and in which said reaction is effected at a pressure in excess of 10 atmospheres for the growth reaction.

4. Improvement according to claim 3 in which said reaction is effected at a temperature between about 90 and 170° C.

5. Improvement according to claim 4 which includes after said reaction raising the temperature of the reaction mixture to above 170° C. to thereby cause splitting off of olefins from the organo aluminum compound formed in the growth reaction.

6. Improvement according to claim 1 in which said olefin is ethylene, and thereafter the organo aluminum compound formed in the growth reaction is reacted with an alpha olefin in the presence of a nickel catalyst.

7. Improvement according to claim 6 in which said nickel catalyst is colloidal nickel.

8. Improvement according to claim 1 in which said olefin is ethylene and in which said reaction is effected at a pressure in excess of 10 atmospheres and at a temperature between about 90 and 170° C. and in which an olefin is split from the organo aluminum compound formed in the growth reaction by heating to a temperature above about 170° C., and in which said initial organo aluminum compound has a higher boiling point than that of the highest olefin formed.

9. Improvement according to claim 1 in which said olefin is ethylene and in which said reaction is effected at a pressure in excess of 10 atmospheres and at a temperature between about 90 and 170° C. and in which an olefin is split from the organo aluminum compound formed in the growth reaction by heating to a temperature above about 170° C., and in which said initial organo aluminum compound has a lower boiling point than that of the lowest olefin formed.

10. Improvement according to claim 1 in which said aluminum trialkyl is present in amount of about 1 to 5% based on said organo aluminum compound reacted with said olefin.

11. Improvement according to claim 1 in which said catalyst is formed in situ from an aluminum hydride.

12. Improvement according to claim 1 which includes inactivating the aluminum catalyst after the reaction by conversion to an organo aluminum compound having only two aluminum-carbon bonds.

13. Improvement according to claim 1 in which said initial organo aluminum compound reacted is a monoalkoxy, dialkyl aluminum.

14. Improvement according to claim 1 in which said organo aluminum compound reacted with the olefin contains a hydrocarbon radical connected to the aluminum atom through an oxygen atom; in which said olefin is ethylene and in which the organo aluminum compound formed in the reaction is oxidized to form a alcoholate.

15. In the displacement reaction process in which an organo aluminum compound is reacted with an alpha olefin under conditions causing the olefin to replace an organic radical connected to the aluminum, the improvement which comprises effecting the reaction using as the organo aluminum compound an organo aluminum compound having two hydrocarbon radicals directly connected to the aluminum atom with a carbon atom free of unsaturated bonds and a third hydrocarbon radical connected to the aluminum atom through a member selected from the group consisting of oxygen and sulfur atoms, and additionally effecting the reaction in the presence of a catalyst comprising an aluminum trialkyl.

16. The improvement according to claim 15 in which said olefin is ethylene and in which at least one of the hydrocarbon radicals directly connected to the aluminum atom in said organo aluminum compound has at least three carbon atoms.

17. The improvement according to claim 16 in which said reaction is effected at normal pressure.

18. The improvement according to claim 15 in which said aluminum trialkyl is present in amount of about 1 to 5% based on said organo aluminum compound reacted with said olefin.

19. The improvement according to claim 15 in which said catalyst is formed in situ from an aluminum hydride.

20. In the displacement reaction process and the growth reaction process in which an organo aluminum compound is reacted with an alpha olefin under conditions causing the olefin to replace an organic radical connected to the aluminum and causing the olefin to add to an organic radical connected to the olefin increasing the molecular size thereof, the improvement which comprises effecting the reaction using an organo aluminum compound having two hydrocarbon radicals directly connected to the aluminum atom with a carbon atom free of unsaturated bonds and a third hydrocarbon radical connected to the aluminum atom through a member selected from the group consisting of oxygen and sulfur atoms, and additionally effecting the reaction in the presence of a catalyst comprising an aluminum trialkyl.

References Cited in the file of this patent

UNITED STATES PATENTS

| | | |
|---|---|---|
| 2,699,457 | Ziegler et al. | Jan. 11, 1955 |
| 2,863,896 | Johnson | Dec. 9, 1958 |
| 2,889,385 | Catterall et al. | June 2, 1959 |